(12) United States Patent
Patil et al.

(10) Patent No.: US 10,711,179 B2
(45) Date of Patent: Jul. 14, 2020

(54) METHOD FOR ENHANCING FLUID RECOVERY FROM SUBSURFACE RESERVOIRS

(71) Applicants: Deepak Patil, Friendswood, TX (US); Ambrish Kamdar, Sugar Land, TX (US); Syed Ali, Sugar Land, TX (US); Oscar Portillo, Richmond, TX (US); Marek Pakulski, The Woodlands, TX (US)

(72) Inventors: Deepak Patil, Friendswood, TX (US); Ambrish Kamdar, Sugar Land, TX (US); Syed Ali, Sugar Land, TX (US); Oscar Portillo, Richmond, TX (US); Marek Pakulski, The Woodlands, TX (US)

( * ) Notice: Subject to any disclaimer, the term of this patent is extended or adjusted under 35 U.S.C. 154(b) by 0 days.

(21) Appl. No.: 16/027,311

(22) Filed: Jul. 4, 2018

(65) Prior Publication Data

US 2020/0010755 A1    Jan. 9, 2020

(51) Int. Cl.
| | |
|---|---|
| *C09K 8/584* | (2006.01) |
| *C09K 8/60* | (2006.01) |
| *E21B 37/00* | (2006.01) |
| *C09K 8/68* | (2006.01) |
| *E21B 43/26* | (2006.01) |

(52) U.S. Cl.
CPC .............. *C09K 8/584* (2013.01); *C09K 8/602* (2013.01); *C09K 8/68* (2013.01); *E21B 37/00* (2013.01); *E21B 43/26* (2013.01)

(58) Field of Classification Search
CPC .......... C09K 8/584; C09K 8/602; C09K 8/68; E21B 37/00; E21B 43/26
See application file for complete search history.

(56) References Cited

U.S. PATENT DOCUMENTS

| 7,380,606 B2 | 6/2008 | Pursley et al. |
| 7,960,314 B2 | 1/2011 | Van Zanten et al. |
| 7,893,010 B2 | 2/2011 | Ali et al. |
| 7,989,404 B2 | 8/2011 | Kakadjian et al. |

(Continued)

OTHER PUBLICATIONS

Ansari et al, Inhibitive performance of gemini surfactants as corrosion inhibitors for mild steel in formic acid, Portugaliae Electrochimica Acta 2010 25(5) 321-335 (Year: 2010).*

*Primary Examiner* — Alicia Bland

(57) ABSTRACT

During "fracking" operations, proppants are used to keep open the fissures that are created, and stimulation fluids are often injected into the subterranean hydrocarbon-bearing geological formations to assist in capturing released hydrocarbons. However, because fissure surfaces formed in subterranean hydrocarbon-bearing geological formations from fracking tend to be hydrophobic, both introduced stimulation fluids and the hydrocarbons from the subterranean hydrocarbon-bearing geological formations tend to adhere to the fissure surfaces. The addition of a gemini surfactant appears to reduce the hydrophobic nature of the geological structure's fissure surfaces, thereby wetting surfaces of indigenous rock and/or introduced proppant surfaces. The addition of the gemini surfactant results in an increase of the fluid flow through the subterranean hydrocarbon-bearing geological formations, thereby enhancing of recovery of hydrocarbons and introduced stimulation fluids.

1 Claim, 4 Drawing Sheets

(56) References Cited

U.S. PATENT DOCUMENTS

| | | | |
|---|---|---|---|
| 7,998,911 B1 | 8/2011 | Berger et al. | |
| 8,091,646 B2 | 1/2012 | Quintero et al. | |
| 9,200,192 B2 | 12/2015 | Zelenev et al. | |
| 2008/0051472 A1* | 2/2008 | Kwetkat | A61K 8/04 516/27 |
| 2008/0287324 A1 | 11/2008 | Pursley et al. | |
| 2009/0281004 A1 | 11/2009 | Ali et al. | |
| 2011/0021386 A1 | 1/2011 | Ali et al. | |
| 2012/0053092 A1* | 3/2012 | Marangoni | C09K 8/035 507/131 |
| 2012/0270758 A1* | 10/2012 | Saini | C09K 8/035 507/119 |
| 2013/0261033 A1 | 10/2013 | Nguyen | |
| 2015/0361323 A1* | 12/2015 | Gamage | C09K 8/035 175/65 |
| 2017/0081582 A1* | 3/2017 | Ghumare | C09K 8/575 |

\* cited by examiner

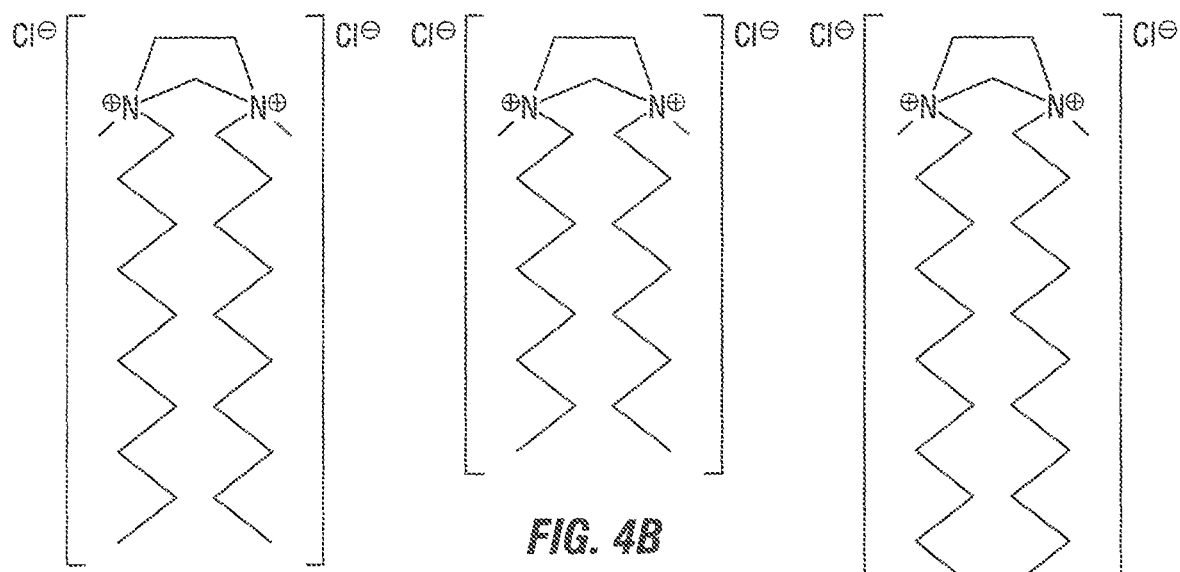
FIG. 4A
FIG. 4B
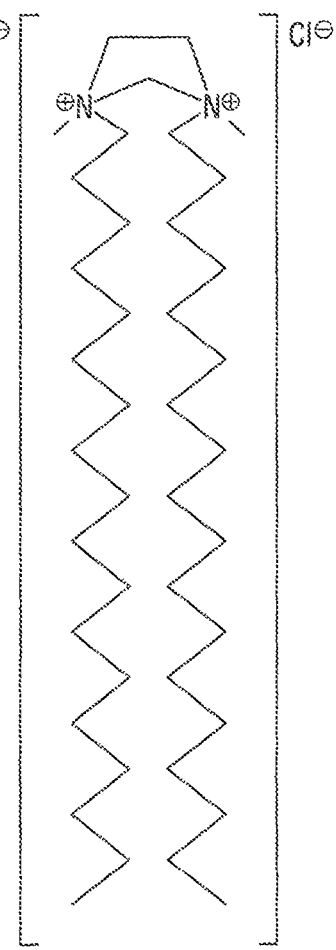
FIG. 4C

METHOD FOR ENHANCING FLUID RECOVERY FROM SUBSURFACE RESERVOIRS

FIELD OF THE INVENTION

The present invention is a method to enhance the removal of fluids from wellbores drilled into subterranean hydrocarbon-bearing geological formations. Fluids as used herein include hydrocarbons within the geological formations as well as introduced stimulation fluids such as hydralic fracturing fluids, brines and other liquids, which also include "flow-back aids".

BACKGROUND OF THE INVENTION

In hydraulic fracturing operations, removing the hydaulic fracturing fluids from subterranean hydrocarbon-bearing geological formations (the wellbore) and minimizing damage to the subterranean hydrocarbon-bearing geological formations are of utmost importance. Flowback aids are increasingly being used in the industry in order to enhance penetration and clean-up of hydraulic fracturing fluids, lower the surface tension of the treating fluid, and increase the contact angle of both water and hydrocarbons on treated mineral surfaces in subterranean hydrocarbon-bearing geological formations, which in turn are allowing for higher fluid return and hydrocarbon production.

Between about 50% to 90% of introduced stimulation fluids injected into wellbores during hydraulic fracturing operations may remain in the subterranean hydrocarbon-bearing geological formations. The trapped introduced stimulation fluids decrease well productivity by effectively lowering the available cross-sectional area available for fluid flow, including that of the hydrocarbons within the subterranean hydrocarbon-bearing geological formations.

Many flow-back aids or stimulation fluids have been developed to increase subterranean formation permeability, thereby enhancing fluid flow through fractured subterranean hydrocarbon-bearing geological formations. The enhanced fluid flow resulting from properly-deployed flow-back aids (or stimulation fluids) reduces potential damage from phase trapping, and the enhanced fluid flow increases the recovery of introduced stimulation fluids and hydrocarbons within the subterranean hydrocarbon-bearing geological formations.

Flow-back aid (or stimulation fluids) formulations typically contain solvents, for example, oils such as hydrocarbons, terpenes, esters, and surfactants and co-surfactants that are in solution or suspended in a microemulsion (see e.g., U.S. Pat. Nos. 8,091,646; 7,998,911; 7,989,404; 7,960,314; 7,893,010; 7,380,606; and 9,200,192; and U.S. Patent Publication Nos. 2011/0021386; 2009/0281004; 2008/0287324, 2012/0270758; 2013/0261033; and non-U.S. Patents and Publications; CA 2,864,308; and WO 2016/105395).

SUMMARY OF THE INVENTION

Introduced Fluids

This invention comprises a novel method for increasing flow back recovery of fluids from subterranean hydrocarbon-bearing geological formations by enhancing fluid flow using a combination of chemicals comprising at least one gemini surfactant and:
1. any water-soluble (i.e., oil-dispersible) solvent;
2. any oil-soluble (i.e., water-dispersible) solvent;
3. anionic, cationic, amphoteric, non-ionic surfactants known to those of ordinary skill in the art; and
4. water.

The gemini surfactant used in this novel method aids in displacing retained water, thereby assisting recovery of hydrocarbons.

The method comprises introducing a gemini surfactant into a subterranean hydrocarbon-bearing geological formation with stimulation fluids. The disclosed gemini surfactants are believed to be particularly effective in reducing interfacial tension between the fluids and subterranean hydrocarbon-bearing geological formation surfaces. This reduction in interfacial tension appears to decrease resistance to fluid flow, thereby increasing the rate of fluid recovery. However, this invention does not depend on this mechanism being the correct explanation for its effectiveness.

Methods of Use

The novel method described herein may be used to enhance the recovery of introduced stimulation fluids injected into subterranean hydrocarbon-bearing geological formations and hydrocarbons that may be present in these structures. Specific embodiments described herein are intended for use in:
  a) Slickwater hydraulic fracturing;
  b) Proppant placement by a gel, followed by the breaking of the gel;
  c) or combination of slickwater and gel known as hybrid;
  d) Flowback of slickwater, broken gels, subsurface brine and injected acids; and/or
  e) Hydrocarbon recovery.

Gemini Surfactants

Gemini surfactants, (see FIG. 1) sometimes called dimeric surfactants, comprise two simple surfactants joined by a spacer A, wherein a simple surfactant molecule is a molecule possessing a water-soluble ("hydrophilic") head ($H_d$) and a water-insoluble ("hydrophobic") end, the "tail" (T). The spacer links the two simple surfactants at or near the hydrophilic heads of the two simple surfactants. In contrast, a conventional or simple surfactant generally is comprised of a single hydrophilic head group and a single tail or hydrophobic group. Gemini surfactants are considerably more surface-active than conventional surfactants.

The hydrophilic head ($H_d$) of a simple surfactant typically possesses at least one chemical entity well-known in the art to promote hydrophilic behavior, including hydroxyl functions —OH, carboxylic acid functions —$CO_2H$, sulfonate functions —$S(O)_2O^-Na^+$, or amines, including quaternary ammonium functionalities.

The hydrophobic tail (T) of a simple surfactant may be a saturated hydrocarbon chain, an unsaturated hydrocarbon chain, or a branched hydrocarbon chain, and the tail may contain cyclic groups. Tails derived from fats and oils also are known. Tails with a general formula —$(CH_2)_nCH_3$, where $3 \leq n \leq 24$, are common.

The spacer A joining the two simple surfactants is typically an alkyl chain that is much shorter than the surfactants' hydrophobic alkyl tails. The spacer A may be more complex than a simple alkyl chain, and may also include hydrophobic alkyl, aryl groups, or other functionalities. The spacer A may link two different simple surfactants, denoted $H_{d1}T_1$ and $H_{d2}T_2$.

Aqueous hydraulic fracturing fluids may include additional components known to those skilled in the art, including acids, friction reducing agents, viscosifying agents, viscosifying agent activators or crosslinkers, de-emulsifiers, biocides, clay stabilizers, anti-foaming agents, pH adjusters, corrosion inhibitors, fluid-loss additives, iron control agents, scale inhibitors, scale control agents, chelating agents, and viscosifying-agent breakers. The claimed gemini surfactants work in the presence or absence of any or all of these agents.

BRIEF DESCRIPTION OF THE DRAWINGS

FIG. 4 shows three quaternary ammonium gemini surfactants described in the Examples and shown in:
(A): "GS-626";
(B): "GS-802"; and
(C): "GS-806".

DETAILED DESCRIPTION OF THE INVENTION

The novel method disclosed herein may be practiced by introducing at least one gemini surfactant as a single phase microemulsion, as an emulsion of a continuous aqueous phase, as an emulsion of a continuous oil phase, or as a solution into subterranean hydrocarbon-bearing geological formations along with other fluids, wherein the concentration of the gemini surfactant is between about 0.00005% and 1.0% by weight of the fracturing fluid. More preferably, the gemini surfactant concentration is between about 0.005% and 0.5% by weight of the fracturing fluid.

Alternatively, a gemini surfactant-based emulsion or solution may be injected into the subterranean hydrocarbon-bearing geological formation separately.

A particular advantage of the invention is that it can be practiced in the presence or absence of "slickwater" solvents. ("Slickwater" is defined throughout this application as water that contains organic solvents and possibly friction-reducing agents.)

Figure 1:
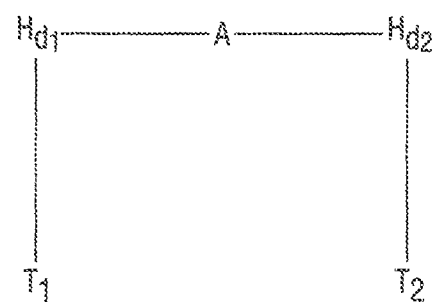
FIG. 1 is a diagram of a gemini surfactant molecule with labeled constituents $T_1$-$H_{d1}$-A-$H_{d2}$-$T_2$, where A is the spacer and simple surfactants $H_{d1}T_1$ and $H_{d2}T_2$ may be the same or different.
Figure 2A:
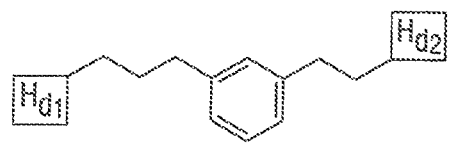
FIG. 2 shows three embodiments of gemini surfactant spacer A where A contains a cyclic group.
Figure 2B:
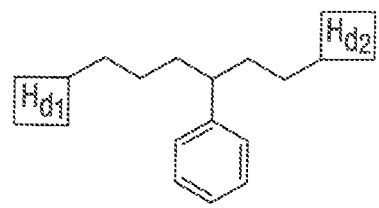
Figure 2C:
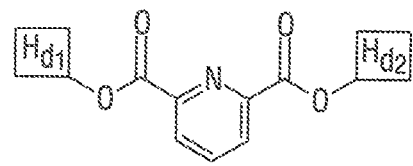

Constituent A of FIG. 1 comprises an alkyl chain —$(CH_2)_n$—, where $1 \leq n \leq 18$, and A may be unbranched or branched, or may include cyclic groups.

Figure 3A:
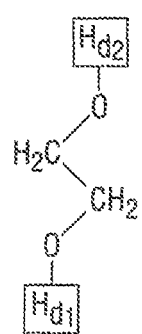
FIG. 3 depicts spacer A as a derivative of:
(A): ethylene glycol;
(B): diethylene glycol; and
(C): triethylene glycol.
Figure 3B:
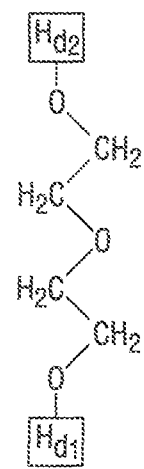
Figure 3C:
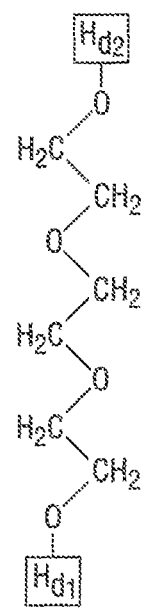

One embodiment of spacer A is shown in FIG. 3 wherein A is ethylene glycol, diethylene glycol or triethylene glycol.

The hydrophobic tails $T_1$ and $T_2$ may be linear or branched alkyl chains —$(CH_2)_n$—, where $1 \leq n \leq 24$, and where cyclic groups, including both aromatic and non-aromatic rings, may be incorporated therein.

Other embodiments include $T_1$ and $T_2$ derived from fats or vegetable oils.

In one embodiment of the disclosed method, quaternary ammonium gemini surfactants of the general formula $T_1$-$H_{d1}$-A-$H_{d2}$-$T_2$ have been tested, wherein the A was an ethylene chain (—$CH_2$—$CH_2$—), wherein the heads $H_{d1}$ and $H_{d2}$ were both —$[N(CH_3)_2$—$]^{\oplus}[Cl]^-$, and wherein both tails $T_1$, $T_2$ were —$(CH_2)_m CH_3$, where m=7, 9, 17. The resulting gemini surfactants are labeled "GS-626", "GS-802", and "GS-806", respectively. While in this example, the negative counter-ion was a chloride, other negative counter-ions may be used, including other halogens, hydroxide $OH^-$, sulfate $SO_4^{-2}$, phospate, sulfonate R—$SO_3^-$ or various carboxylates.

TABLE 1

"GS-626", "GS-802" and "GS-806" gemini surfactants.

| Gemini Surfactant | A | $H_{d1}$, $H_{d2}$ | $T_1$, $T_2$ |
|---|---|---|---|
| GS-626 | —$CH_2$—$CH_2$— | $[—N(CH_3)_2—]^{\oplus}[Cl]^-$ | —$(CH_2)_9 CH_3$ |
| GS-802 | —$CH_2$—$CH_2$— | $[—N(CH_3)_2—]^{\oplus}[Cl]^-$ | —$(CH_2)_7 CH_3$ |
| GS-806 | —$CH_2$—$CH_2$— | $[—N(CH_3)_2—]^{\oplus}[Cl]^-$ | —$(CH_2)_{17} CH_3$ |

Gemini surfactants may be blended with nonionic, anionic, or cationic surfactants, but are such blending is not required and the gemini surfactants perform well without addition of any other surfactants.

EXAMPLES

Elution Test Procedure

To simulate the effectiveness of this method, elution rates of water, acid and oil through a proppant-packed column were determined by the protocol described below.

Materials

A paraffinic napthenic oil having a specific gravity of 0.821 g/cm$^3$ and viscosity 1.2 cSt (e.g., ODC-15 Oil®, Sasol North America) and:
a) 15% hydrochloric acid;
b) partially hydrolyzed anionic polyacrylamide (PHPA) friction-reducing polymer (e.g., Kemflow 4370®, Kemira Oyj, Helsinki, Finland);
c) 40/45 cps grade fast-hydrating guar gum;
d) sodium borate;
e) ammonium persulfate; and
f) sodium chlorite were mixed in concentrations expected to be encountered in a processed wellbore, with the gemini surfactant formulation, "GS-802", having a concentrations in the resulting fluid of between about 0.005 and 0.015 percent by weight.

Column Test Description

A glass, 1" diameter, 9" height column of known weight and a 250 milliliters reservoir bulb, which was placed atop the column (to maintain a head pressure), were used in the following protocols:

Preparation of Proppant Packed Column

1. Dry 40/70 mesh Ottawa Sand proppant ("Ottawa Sand" is a common name for a rounded quartz sand possessing a narrow size distribution as described in ASTM C778) was poured into the column, and the column was tapped and shaken to pack the proppant. The packed column was weighed to determine the amount of proppant contained.
2. Tap water was slowly poured into the column in an amount that exceeds the packed proppant height. Water was then released from the column bottom until the water meniscus was aligned with the top of the packed proppant. The packed, hydrated column was weighed again to determine the pore volume (a dimensionless quantity).
3. Test solutions composed of the paraffinic oil and various additives were placed atop the column and allowed to elute completely through the proppant column. The time required for eluent to flow in increments of pore volume was recorded.
4. Elution samples were collected as a function of time to be tested for surface tension and/or elution time.

Example 1

It is convenient to describe the amount of gemini surfactant used in terms of gallons of gemini surfactant preparation (emulsion or solution) dispensed per thousand gallons of stimulation fluid. The notation "2-GPT" denotes 2 gallons of gemini surfactant preparation containing between 0.01 and 0.02 percent by weight of gemini surfactant in the stimulation fluid, dispensed per thousand gallons of stimulation fluid. In one embodiment of the novel method, 2-GPT (gallons gemini surfactant preparation per thousand gallons solution) a solution containing 0.01% by weight of GS-626 was made in water. In another embodiment of the novel method, 2-GPT (gallons gemini surfactant preparation per thousand gallons solution) a solution containing 0.01% by weight of GS-802 was made in water. Surface tension of these surfactants were found to be 26.9 mN/m and 25.3 mN/m, respectively.

Example 2

In another embodiment of the novel method, tap water was mixed with 50% solution of GS-802 at 2-GPT loading, wherein the gemini surfactant was at a concentration of 0.01% by weight. 125 milliliters of the 2-GPT fluid was poured into the bulb above the sand column and allowed to drain completely. Once drained, tap water was added to the bulb, and surface tension of this tap water, after it flowed through the sand column, was tested for surface tension. The data below show an enhancement effectiveness of stimulation agents when a gemini surfactant is added.

TABLE 2

Tap water elution enhanced with GS-802

| Water | | Water with GS-802 | |
| --- | --- | --- | --- |
| Pore Volumes | Surface Tension mN/m | Pore Volumes | Surface Tension mN/m |
| 5 | 70 | 5 | 28.3 |
| 25 | 70 | 25 | 28.5 |
| 50 | 70 | 50 | 29.0 |
| 75 | 70 | 75 | 29.2 |
| 100 | 70 | 100 | 29.4 |

Example 3

In another embodiment of the novel method, slickwater was made by diluting a partially-hydrolyzed anionic polyacrylamide (PHPA) friction-reducing polymer, e.g., Kemflow 4370®, Kemira Oyj, Helsinki, Finland, at a dosage of 1-GPT, and 7.5% sodium chlorite at a dosage of 1-GPT in tap water. Part of this solution was mixed with GS-802 at a dosage of 2-GPT containing 0.01 percent by weight of gemini surfactant in the stimulation fluid. The resultant solutions were heated to 70° C., cooled to room temperature and used for column experiments.

TABLE 3

Slickwater elution enhanced with GS-802.

| No surfactant | | With GS-802 | |
| --- | --- | --- | --- |
| Pore Volumes | Time, Seconds | Pore Volume | Time, Seconds |
| 1 | 1,540 | 1 | 385 |
| 2 | 1,990 | 2 | 320 |

TABLE 3-continued

Slickwater elution enhanced with GS-802.

| No surfactant | | With GS-802 | |
| --- | --- | --- | --- |
| Pore Volumes | Time, Seconds | Pore Volume | Time, Seconds |
| 3 | 2,651 | 3 | 325 |
| 4 | 18,183 | 4 | 336 |
| 5 | 43,200* | 5 | 346 |

*Test Terminated

Example 4

Tap water was mixed with 40/45 cps grade fast-hydrating guar gum, sodium borate and sodium chlorite in a blender for 3 minutes to produce a hydraulic fracturing fluid. Part of this hydraulic fracturing fluid was mixed with GS-802 at a dosage of 2-GPT containing 0.01 percent by weight of gemini surfactant in the stimulation fluid. 125 milliliters (≈5 pore volumes) of hydraulic fracturing fluid was charged to the bulb above the sand column, and the bulb was then filled with 125 milliliters of mineral oil. Time required for first trace of mineral oil to come out was noted.

TABLE 4

Elution of fracturing fluid enhanced with GS-802.

| Fracturing Fluid, followed by mineral oil followed by Mineral oil Time, Seconds | Fracturing Fluid with GS-802 followed by Mineral Oil Time, Seconds |
| --- | --- |
| 774 | 273 |

The invention claimed is:
1. A method for enhancing the extraction of fluids from subterranean hydrocarbon-bearing, geological formations, comprising introducing a Gemini surfactant into the subterranean hydrocarbon-bearing geological formation, wherein the Gemini surfactant comprises a first simple surfactant molecule $(T_1Hd_1)$ and a second simple surfactant molecule $(Hd_2T_2)$, linked by a spacer moiety (A), wherein the general formula of the Gemini surfactant is $(T_1Hd_1)$-A-$(Hd_2T_2)$;
   a. wherein the first simple surfactant molecule, $(Hd_1T_1)$ comprises a hydrophobic tail $T_1$ and a hydrophilic head $Hd_1$ and the second surfactant molecule $(Hd_2T_2)$ comprises a by tail $T_2$ and a hydrophilic head $Hd_2$;
   b. wherein the first simple surfactant molecule $(Hd_1T_1)$ is chemically abound to the spacer moiety (A) at, or near, the hydrophilic head $(Hd_1)$ of the first simple surfactant molecule, and the second simple surfactant molecule $(Hd_2T_2)$ is chemically bound to the spacer moiety (A) at, or near, the hydrophilic head $(Hd_2)$ of the second simple surfactant molecule, and
   c. wherein $Hd_1T_1$ is $[(CH_3)_2N(CH_2)_mCH_3]\oplus[Cl]\ominus$, $Hd_2T_2$ is $[(CH_3)_2N(CH_2)_mCH_3]\oplus[Cl]\ominus$, the spacer moiety A is $(CH_2)_2$, and where m is 7.9 or 17.

* * * * *